US010149540B2

(12) United States Patent
Corless

(10) Patent No.: US 10,149,540 B2
(45) Date of Patent: Dec. 11, 2018

(54) SNAP-IN BRACKET FOR SLIDABLE RACKS AND METHOD OF USE

(71) Applicant: Hardware Resources, Inc., Bossier City, LA (US)

(72) Inventor: Justin Corless, Dallas, TX (US)

(73) Assignee: Hardware Resources, Inc., Bossier City, LA (US)

( * ) Notice: Subject to any disclaimer, the term of this patent is extended or adjusted under 35 U.S.C. 154(b) by 0 days.

(21) Appl. No.: 15/291,560

(22) Filed: Oct. 12, 2016

(65) Prior Publication Data

US 2018/0098630 A1 Apr. 12, 2018

(51) Int. Cl.
*A47B 96/06* (2006.01)
*A47B 61/00* (2006.01)
(Continued)

(52) U.S. Cl.
CPC .......... *A47B 96/067* (2013.01); *A47B 61/003* (2013.01); *A47B 61/02* (2013.01);
(Continued)

(58) Field of Classification Search
CPC ..... A47B 96/067; A47B 61/003; A47B 61/02; F16B 2/22; F16B 5/0664; F16B 5/126
(Continued)

(56) References Cited

U.S. PATENT DOCUMENTS 724,427 A 4/1903 Bonsall
1,078,715 A * 11/1913 Cherry, Jr. ............. A47B 61/02
190/13 R
(Continued)

FOREIGN PATENT DOCUMENTS

AU 709818 B2 8/1997
CA 1223555 A 6/1987
(Continued)

OTHER PUBLICATIONS

Art eStuff.com, "New Hanging & Lighting, Hanging & Lighting, Wall System," http://ww.artestuff.com/index/php?cPath=163_162, accessed Oct. 2015, 4 pages.
(Continued)

*Primary Examiner* — Ko H Chan
(74) *Attorney, Agent, or Firm* — Schultz & Associates, P.C.

(57) ABSTRACT

A snap-in mounting bracket with a generally "U" shaped cross-section. A set of mounting holes are spaced along the web of the bracket and correspond to existing holes in prefabricated cabinets or closets over a range of industry standard sizes. A guide flange extends from the web proximate the middle of a first edge. End flanges curve around the ends of the first edge. A pair of spring flanges extend from the web on a second edge opposite the middle guide flange. A universal slide assembly is removably secured to the mounting bracket between the flanges. The end flanges and the spring tension of the spring flanges hold the slide assembly in place. Different closet organizer components such as tie racks, pant racks, and belt racks can be affixed to the slide assembly for slidable deployment along the vertical partition out of the closet.

16 Claims, 13 Drawing Sheets

(51) Int. Cl.
*F16B 2/22* (2006.01)
*F16B 5/06* (2006.01)
*F16B 5/12* (2006.01)
*A47B 61/02* (2006.01)

(52) U.S. Cl.
CPC .............. *F16B 2/22* (2013.01); *F16B 5/0664* (2013.01); *F16B 5/126* (2013.01)

(58) Field of Classification Search
USPC ........................................................ 211/85.3
See application file for complete search history.

(56) References Cited

U.S. PATENT DOCUMENTS

| | | | | |
|---|---|---|---|---|
| 1,574,705 | A | * | 2/1926 | Sessions .............. A47B 61/003 |
| | | | | 211/94.02 |
| 2,102,405 | A | | 12/1937 | Coggiola |
| 2,754,974 | A | | 7/1956 | Larson |
| 3,172,540 | A | | 3/1965 | Berge |
| 3,239,182 | A | | 3/1966 | Blanz |
| 3,756,637 | A | | 9/1973 | Wildi |
| 3,985,325 | A | * | 10/1976 | Ginsburg .............. A47F 5/0823 |
| | | | | 248/220.22 |
| 4,022,415 | A | * | 5/1977 | Roderick .............. A47H 19/00 |
| | | | | 160/349.2 |
| 4,320,935 | A | | 3/1982 | Nagelkirk |
| 4,763,579 | A | | 8/1988 | Cibulak |
| 4,995,323 | A | | 2/1991 | Kellems |
| 5,332,108 | A | | 7/1994 | Blass |
| 5,482,168 | A | | 1/1996 | Welch et al. |
| 5,718,493 | A | | 2/1998 | Nikolai |
| 6,230,903 | B1 | * | 5/2001 | Abbott .................. A47B 88/43 |
| | | | | 211/190 |
| 6,669,157 | B1 | * | 12/2003 | Willin .................. A47K 10/185 |
| | | | | 248/311.2 |
| 6,871,749 | B2 | | 3/2005 | Bostick et al. |
| 6,932,225 | B2 | | 8/2005 | Rowe |
| 6,935,519 | B2 | | 8/2005 | Lawson et al. |
| 7,861,901 | B2 | | 1/2011 | Kirschbaum |
| 7,900,781 | B2 | | 3/2011 | Baine et al. |
| 8,066,237 | B2 | * | 11/2011 | Tyner ........................ A47F 1/04 |
| | | | | 211/85.17 |
| 8,302,786 | B2 | | 11/2012 | Kao |
| 9,545,153 | B2 | * | 1/2017 | Chen .................... H05K 7/1489 |
| 9,560,914 | B2 | * | 2/2017 | Bright .................... A47B 96/02 |
| 2011/0088332 | A1 | | 4/2011 | Allis et al. |
| 2011/0147551 | A1 | | 6/2011 | Richard et al. |
| 2014/0111073 | A1 | | 4/2014 | Kunis |
| 2014/0291467 | A1 | * | 10/2014 | Yang ...................... A47B 61/02 |
| | | | | 248/424 |
| 2015/0027972 | A1 | | 1/2015 | Andersson et al. |

FOREIGN PATENT DOCUMENTS

| | | |
|---|---|---|
| EP | 1029480 A1 | 8/2000 |
| GB | 1362547 A | 8/1974 |

OTHER PUBLICATIONS

Clip Rail, "Installation Instructions," Peak Rock Ltd, white 2m (6ft 6) [RC-W-200], Picture Hanging, picturehanging.com, accessed: Oct. 2015, 1 page.

Houzz, houzz.com, Rail Anchor Pot and Pan Rack, Wall Mounted—Industrial—Pot Racks and Accessories—by Railroadware, http://www.houzz.com/photos/11800582/Rail-Anchor-Pot-and-Pan-Rack-Wall-Mounted-industrial-pot-racks-and-accessories, accessed: Oct. 2015, 3 pages.

* cited by examiner

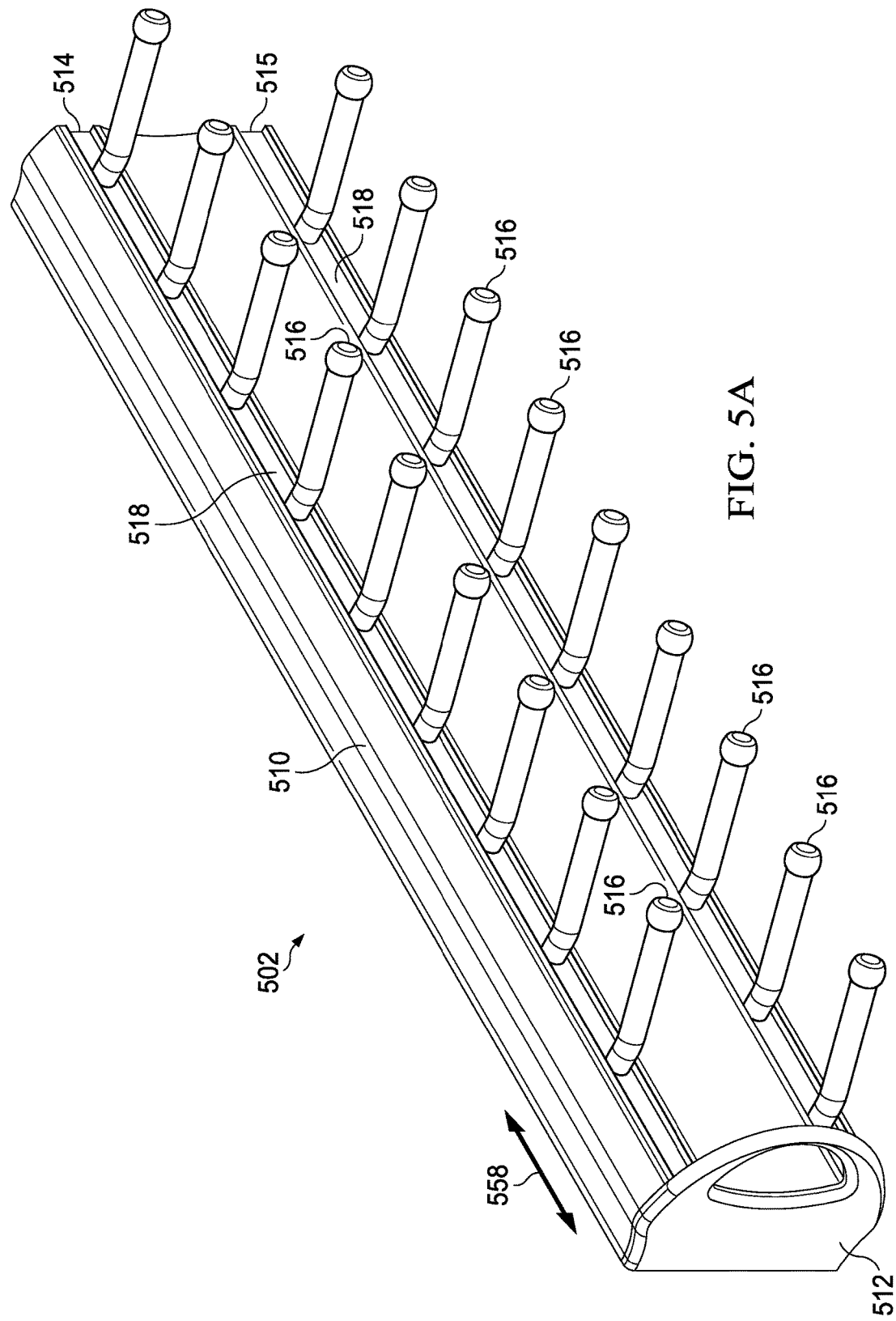

SNAP-IN BRACKET FOR SLIDABLE RACKS AND METHOD OF USE

FIELD OF THE DISCLOSURE

This disclosure relates to mounting brackets. In particular, the disclosure relates to a snap-in bracket for attaching slide rail assemblies to a partition for closet organization applications.

BACKGROUND OF THE DISCLOSURE

Prefabricated closet panels include pre-drilled mounting holes for the attachment of closet organizer components such as clothing racks and shelving systems. Different panels can include differently spaced mounting holes. Similarly, different components can have differently space mounting holes. As a result, an installer is sometimes forced to drill additional holes in the closet panels to align with the mounting holes of other panels or components in order to mount them to the closet panel.

The prior art presents a multitude of movable racks for installation on the closet panels.

For example, U.S. Pat. No. 6,935,519 to Lawson, et al. discloses a pants/skirts closet rack apparatus adaptable to be installed horizontally into a closet receptacle. The apparatus comprises right and left attachments affixed to slide assemblies directly mounted to the spaced vertical walls of the closet receptacle. Front and back tubular elements connect between the right and left attachments and hangers rest on the tubular elements.

U.S. Pat. No. 6,871,749 to Bostick, et al. discloses a valet rack assembly comprising a three-piece slide assembly having a base rail installed directly on a closet sidewall, an intermediate rail connected to the base rail, an outer housing member slidably coupled to the intermediate rail. An apparel support member in the form of a tie clasp or belt post is slidably coupled to the outer housing member.

The prior art has failed to devise a way to quickly and economically match various hole patterns between closet panels and closet components. Therefore, a need exists for a mounting bracket that can be mounted to a closet panel using any pre-drilled mounting hole pattern and that does not require the drilling of additional mounting holes. There is also a need for a mounting bracket having modular capability where different styles of closet organizer components may be interchangeably attached. There is also a need for a mounting bracket that is capable of being manufactured in different sizes for different closet organizer components while still accommodating the different pre-drilled mounting hole patterns.

SUMMARY

The device disclosed provides for a "snap-in" installation of a slide rail assembly with no requirement for a particular pre-drilled hole pattern. In one preferred embodiment, a mounting bracket is provided with a generally "C" shaped cross-section comprising flanges extending from a web. A set of mounting holes are spaced along the web and correspond to many existing hole patterns over a range of industry standard sizes. A guide flange extends from one edge of the web proximate the middle of the bracket. End flanges extend from the same edge of the web at each end of the bracket. A pair of spring flanges extend from the opposite edge of the web across from the guide flange.

In use, the device is mounted to a partition of a prefabricated closet with typical mounting hardware such as wood screws through the set of mounting holes aligned with preexisting mounting holes in the vertical partition. The outer slide of a slide assembly is positioned between the end flanges, pressed under the guide flange, and snapped into place against the tension of the spring flanges. The web of the outer slide is positioned adjacent the web of the bracket. The end flanges and the spring tension of the spring flanges hold the slide assembly in place. Different closet organizer components can be interchangeably affixed to the slide assembly.

BRIEF DESCRIPTION OF THE DRAWINGS

Reference will now be made to the drawings. In the descriptions that follow, like parts are marked throughout the specification and drawings with the same numerals. The drawing figures are not necessarily drawn to scale and certain figures may be shown in exaggerated or generalized form in the interest of clarity and conciseness.

FIG. 5A is an isometric view of a tie rack attached to a slide assembly.

DETAILED DESCRIPTION

Figure 1:
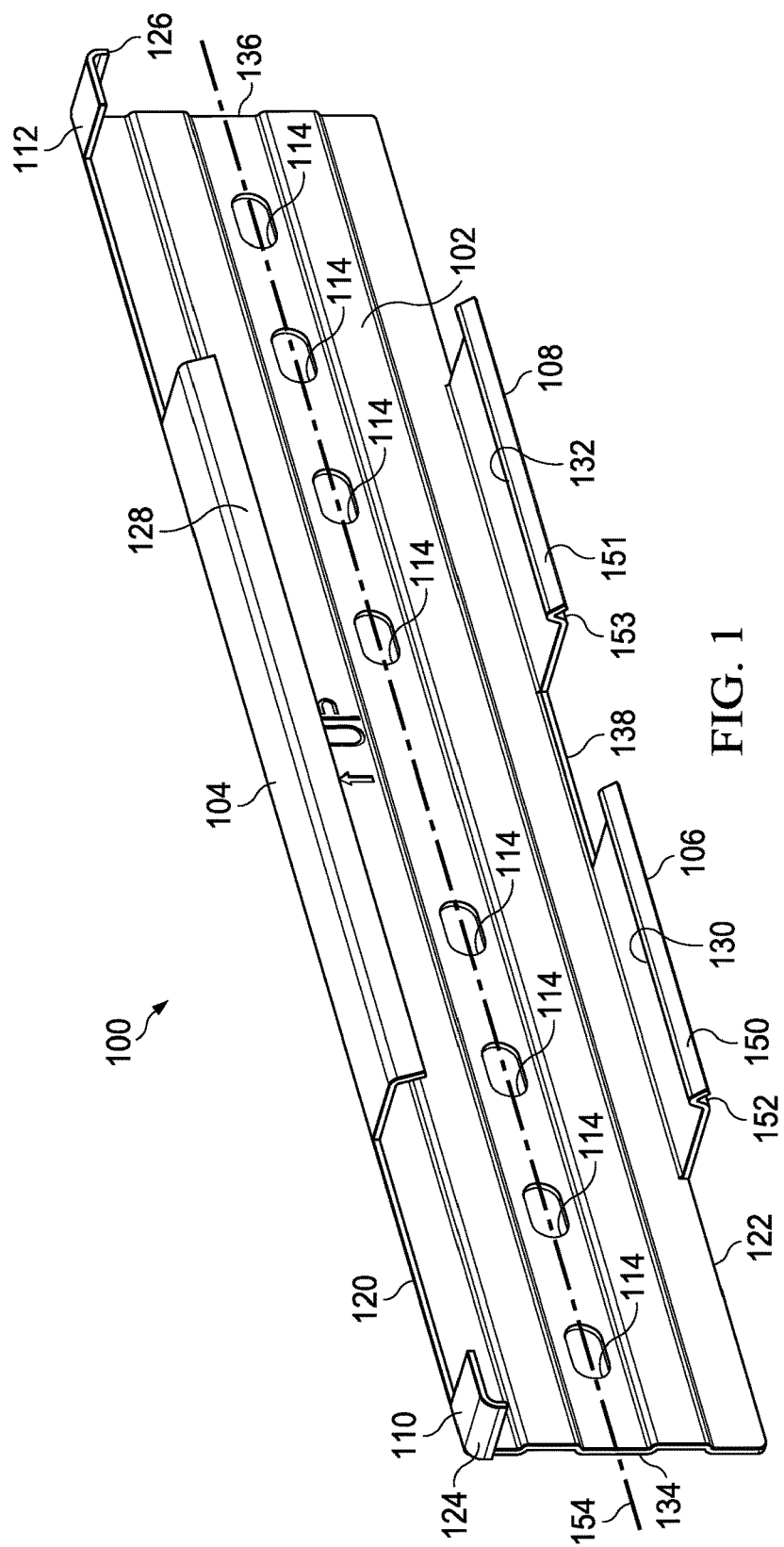
FIG. 1 is an isometric view of a preferred embodiment of a mounting bracket.
Figure 2:
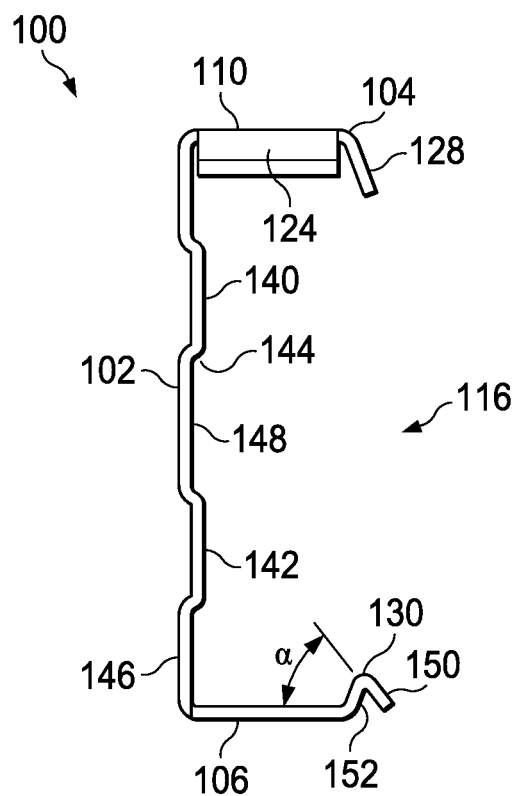
FIG. 2 is a cross-section view of a preferred embodiment of a mounting bracket.

Referring to FIGS. 1 and 2, bracket 100 has a generally "C" shaped cross-section comprised of guide flange 104, end flanges 110 and 112, and spring flanges 106 and 108 extending from web 102. The combination of the flanges and web define interior 116. Web 102 has side 144, adjacent interior 116, and side 146. Between edges 120 and 122, web 102 further includes ridges 140 and 142 which run the length of bracket 100 and extend toward interior 116 from side 144. Positioned between ridges 140 and 142 is recess 148. Mounting holes 114 are oblong shaped and located within recess 148. The longitudinal axes of the mounting holes are parallel to longitudinal axis 154 of the bracket. Mounting holes 114 are evenly spaced along the length of bracket 100 and pass through web 102 between sides 144 and 146. In an alternate embodiment, mounting holes 114 are circular.

Guide flange 104 extends from the proximate middle of edge 120. As oriented in the figures, edge 120 is the upper edge of bracket 100 while edge 122 is the lower edge. End flanges 110 and 112 extend from edge 120 at ends 134 and 136 of bracket 100, respectively. Spring flanges 106 and 108 extend from edge 122 and define gap 138 between the spring flanges. In an alternate embodiment, the guide flange and the end flanges extend from the lower edge while the spring flanges extend from the upper edge. In another alternate embodiment, spring flanges 106 and 108 are combined into one spring flange.

Guide flange 104 extends generally perpendicularly from web 102 and terminates with hook 128 directed toward interior 116. End flange 110 extends generally perpendicularly from web 102 and includes hook 124 which curves around end 134. End flange 112 extends generally perpendicularly from web 102 and includes hook 126 which curves around end 136. Spring flanges 106 and 108 extend generally perpendicularly from web 102 and terminate in bent sections 130 and 132, respectively. Bent section 130 includes abutment surface 150 and holding surface 152. Bent section 132 includes abutment surface 151 and holding surface 153. Abutment surfaces 150 and 151 are oriented at angle $\alpha$ from spring flanges 106 and 108, respectively. Angle $\alpha$ is generally between 30° and 60°, however other angles are envisioned.

Figure 3:
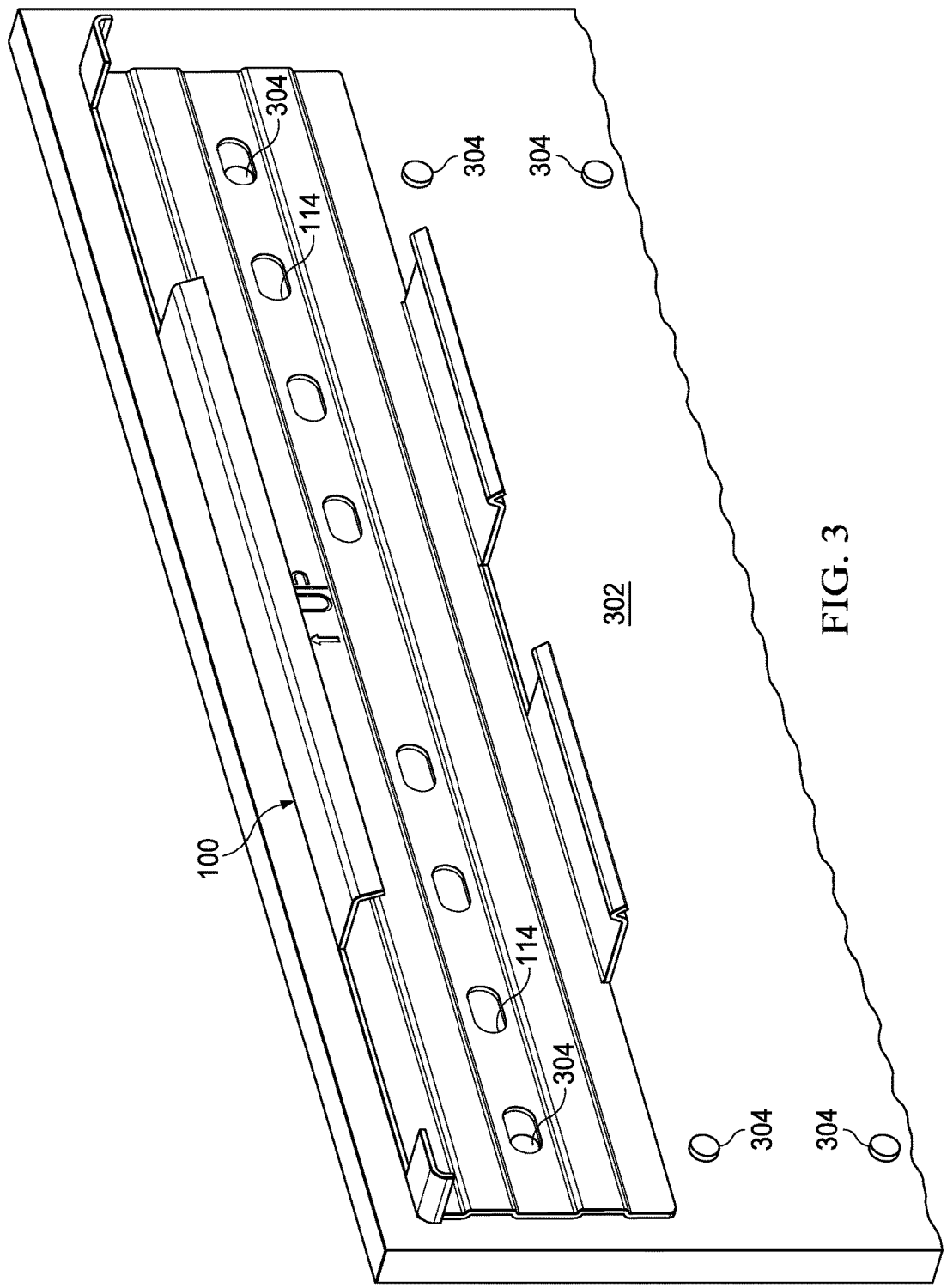
FIG. 3 is an isometric view of a preferred embodiment of a mounting bracket attached to a closet partition.
Figure 5B:
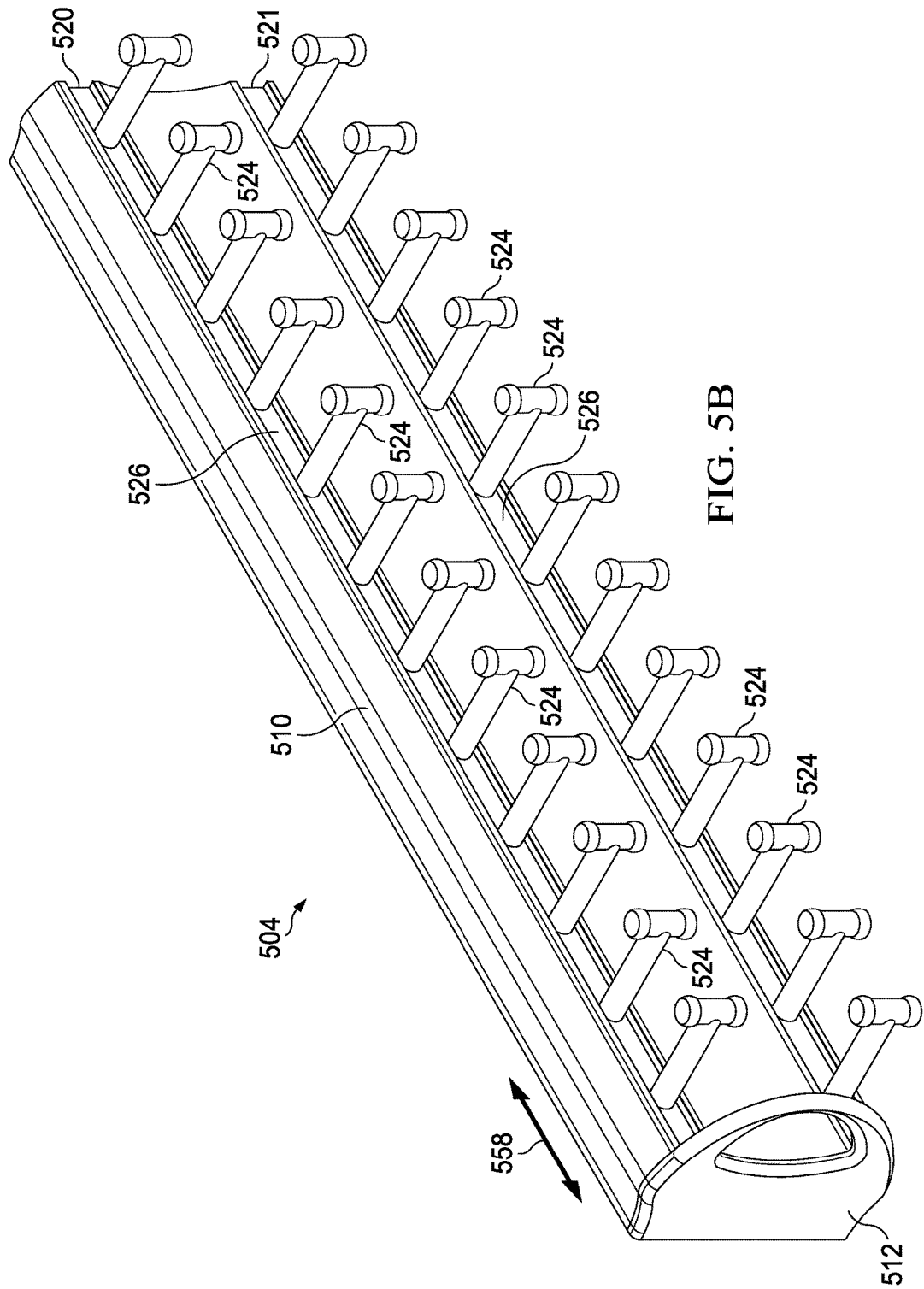
FIG. 5B is an isometric view of a belt rack attached to a slide assembly.
Figure 5C:
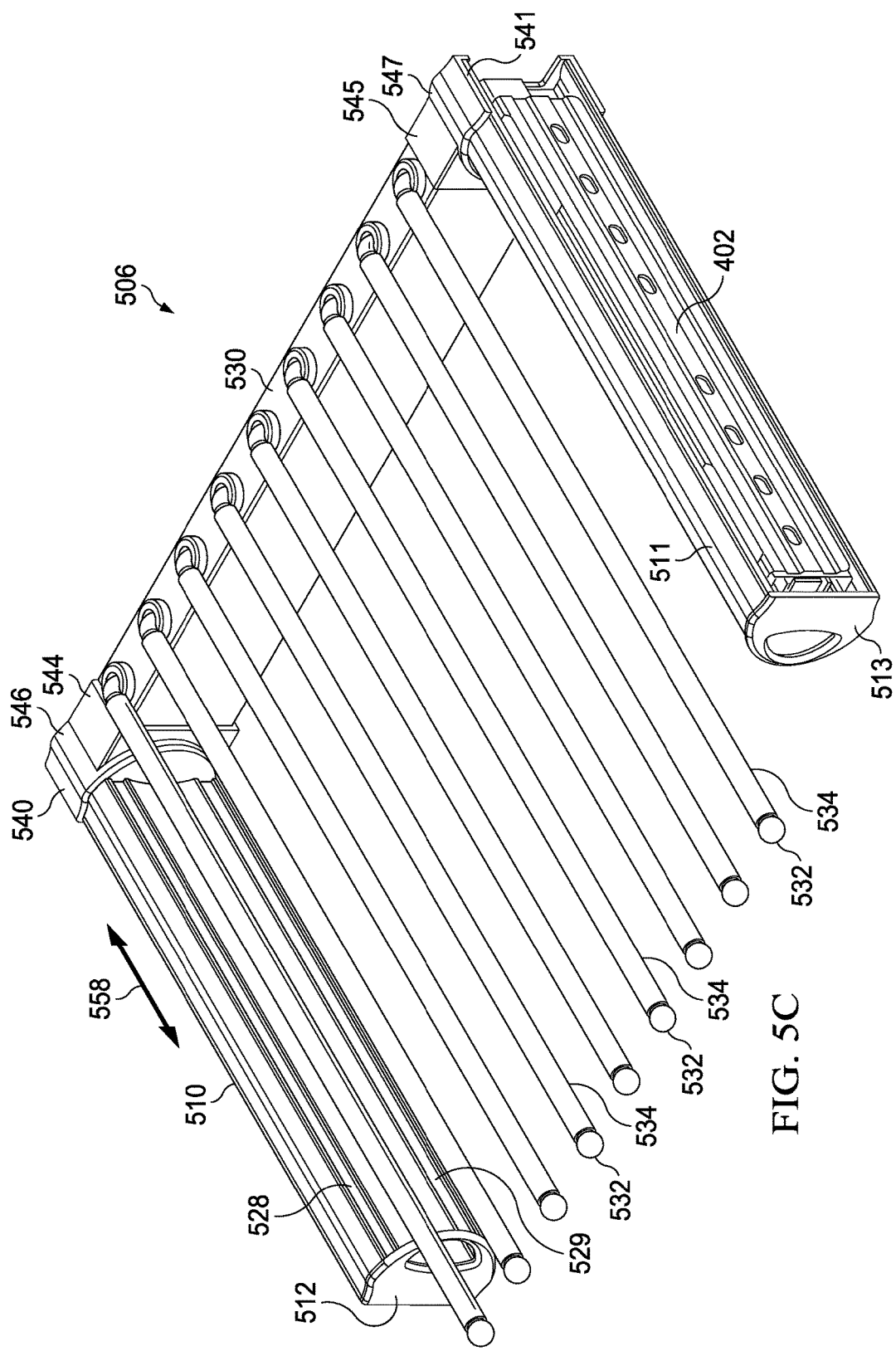
FIG. 5C is an isometric view of a pants rack attached to a pair of slide assemblies.
Figure 5D:
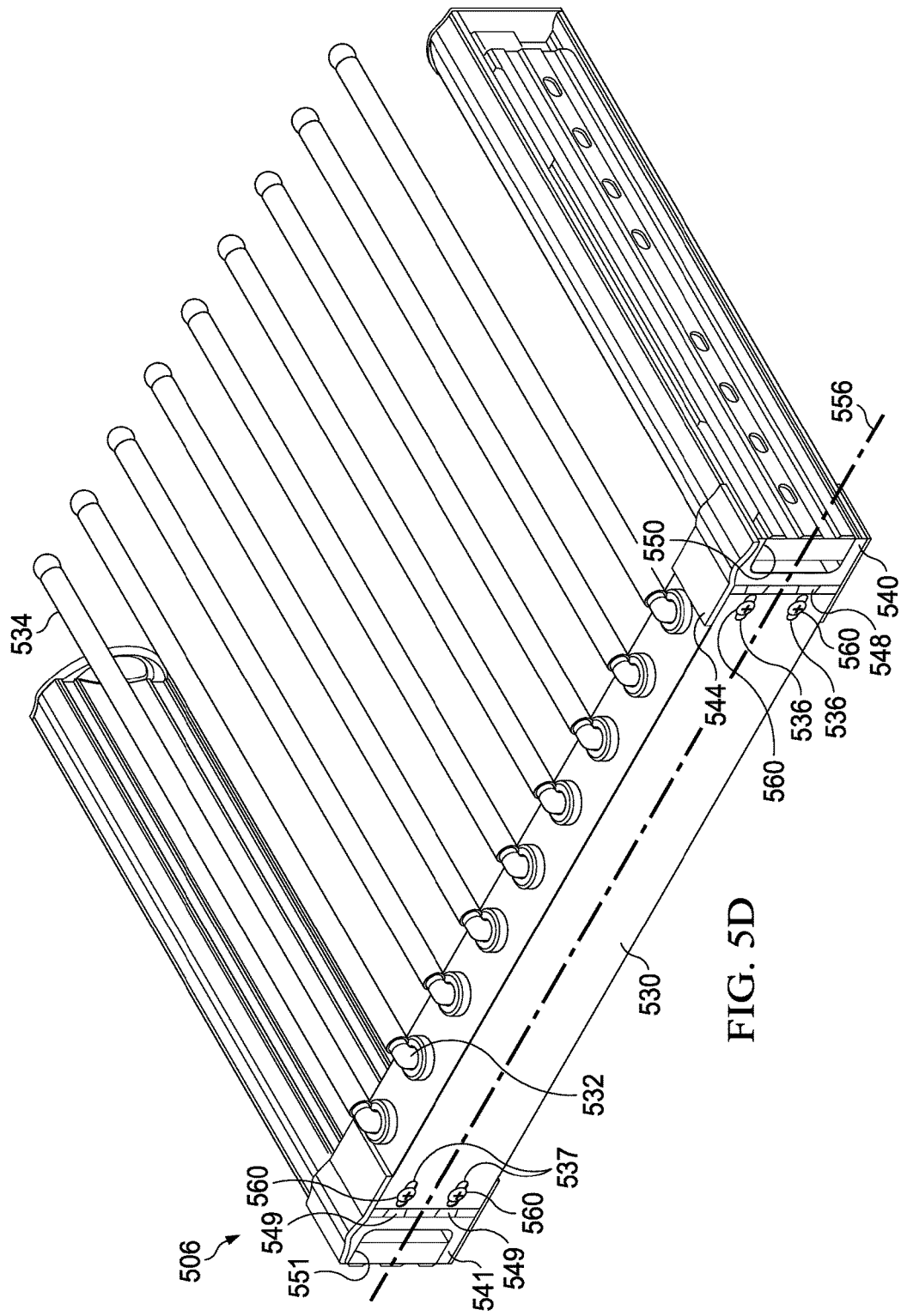
FIG. 5D is a rear isometric view of a pants rack attached to a pair of slide assemblies.

Referring to FIG. 3, bracket 100 is shown positioned for mounting to closet partition 302. Closet partition is a vertical wall of a closet. Prefabricated closet partition 302 is manufactured with pre-drilled mounting holes 304 according to industry standards. Closet partitions are manufactured in many different sizes and therefore include many different pre-drilled mounting hole patterns. Mounting holes 114 in bracket 100 are aligned with pre-drilled mounting holes 304. Mounting hardware such as wood screws are used to secure side 146 of bracket 100 to closet partition 302 through mounting holes 114 and pre-drilled mounting holes 304. Recess 148 allows for the head of the mounting hardware to be flush with ridges 140 and 142 and therefore not interfere with an attached drawer slide assembly.

Figure 4:
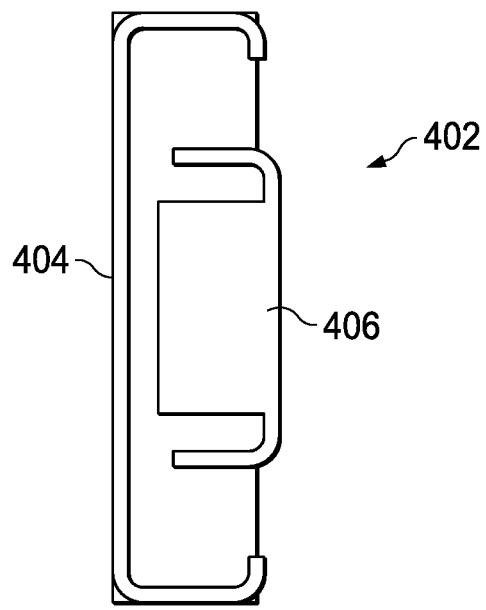
FIG. 4 is an end view of a slide assembly.

FIG. 4 depicts an end view of a slide assembly. Slide assembly 402 is comprised of outer rail 404 slidingly engaged with inner rail 406. In an alternate embodiment, an intermediate rail may be slidingly engaged with both the outer rail and the inner rail. The slide assembly is a part of a closet organizer component such as a tie rack, a belt rack, or a pants rack which will be described further.

Referring to FIGS. 5A-5D, closet organizer component tie rack 502, belt rack 504, and pants rack 506 are shown. The common parts to each closet organizer component are slide assembly 402, housing 510, and front cap 512. Slide assembly 402, housing 510, and front cap 512 are interchangeable between the different closet organizer components.

Tie rack 502 further includes rails 514 and 515 slidingly engaged with housing 510. Each rail 514 and 515 includes a series of evenly spaced pins 516 extending from shaft 518. Front cap 512 is engaged with housing 510. Tie rack 502 is movable in direction 558 between a stored position within the closet and a deployed position exterior to the closet.

Belt rack 504 further includes rails 520 and 521 slidingly engaged with housing 510. Each rail 520 and 521 includes a series of evenly spaced "T" shaped pins 524 extending from shaft 526. Front cap 512 is engaged with housing 510. Belt rack 504 is movable in direction 558 between a stored position within the closet and a deployed position exterior to the closet.

Pants rack 506 includes two slide assemblies 402, housings 510 and 511, and front caps 512 and 513. Rails 528 and 529 are slidingly engaged with housing 510. Additional rails (not shown) are similarly engaged with housing 511. Front cap 512 is engaged with housing 510 and front cap 513 is engaged with housing 511. Brace 530 extends between housings 510 and 511. Bars 532 extend from and are pivotally engaged with brace 530. Each bar 532 includes sheath 534 to provide a non-slip surface for contact with pants hung thereon. Brace 530 includes mounting slots 536 and 537. The longitudinal axes of mounting slots 536 and 537 are parallel with longitudinal axis 556 of brace 530. Brace 530 is adjustably connected to rear caps 540 and 541 via mounting slots 536 and 537, respectively. Rear cap 540 includes hood section 544 and attachment section 546. Attachment section 546 is shaped to mimic the profile of housing 510 and is connected to housing 510. Hood section 544 defines stanchions 548 aligned with mounting slots 536. Rear cap 540 further defines cutout 550 sized to allow passage of bracket 100 and outer rail 404. Rear cap 541 includes hood section 545 and attachment section 547. Attachment section 547 is shaped to mimic the profile of housing 511 and is connected to housing 511. Hood section 545 defines stanchions 549 aligned with mounting slots 537. Rear cap 541 further defines cutout 551 sized to allow passage of bracket 100 and outer rail 404. Connecting hardware 560 such as screws or rivets are used to connect brace 530 to the rear caps through mounting slots 536 and 537 and stanchions 548 and 549. Pants rack 506 is movable in direction 558 between a stored position within the closet and a deployed position exterior to the closet.

Figure 6A:
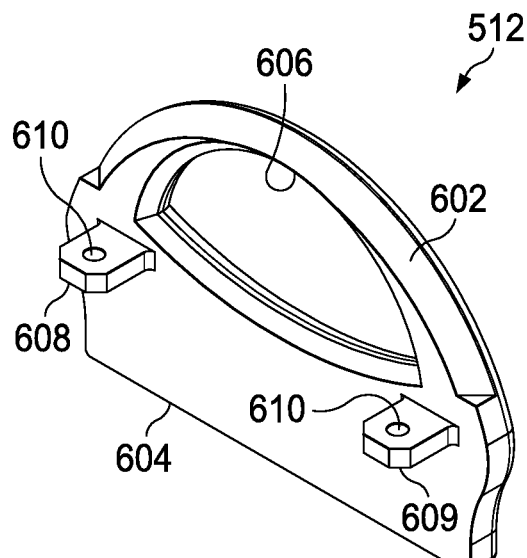
FIG. 6A is an isometric view of a universal front cap for closet organizer components.
Figure 6B:
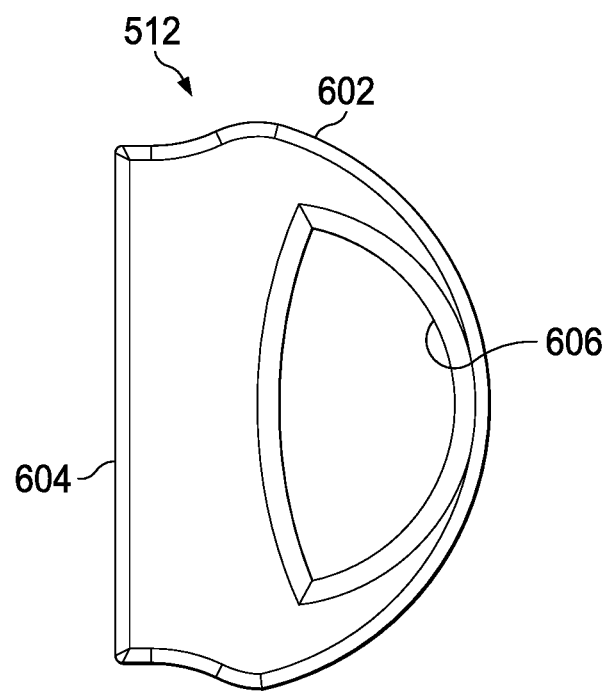
FIG. 6B is an end view of a universal front cap for closet organizer components.

Referring to FIGS. 6A and 6B, front cap 512 is generally semicircular shaped having curved edge 602 and straight edge 604. Front cap 512 is generally planar and includes a semicircular shaped cutout 606. Cutout 606 is sized to use as a handle. Tabs 608 and 609 extend generally perpendicularly from one side of front cap 512. Tabs 608 and 609 include mounting holes 610. Front cap 513 is configured exactly as front cap 512 and will not be described further.

Figure 7:
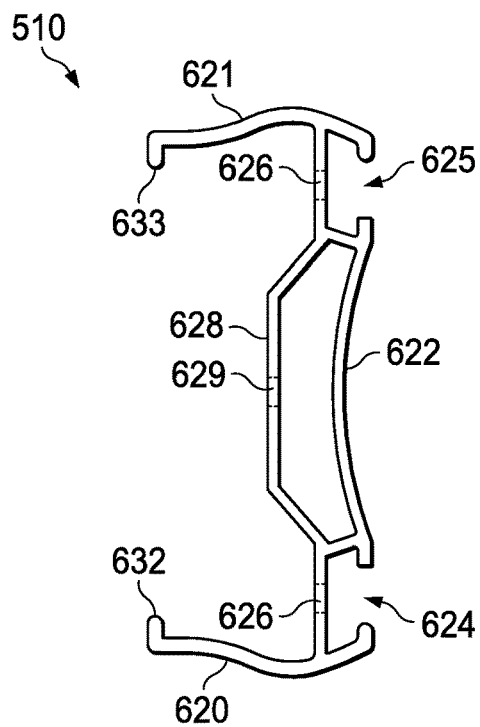
FIG. 7 is an end view of a universal housing for closet organizer components.

Referring to FIG. 7, housing 510 is a generally extruded channel having a length proximate to the length of bracket 100. Housing 510 includes middle portion 622 connected between sides 620 and 621. Middle portion 622 defines slots 624 and 625 proximate sides 621 and 622, respectively. Slots 624 and 625 include a series of aligned mounting holes 626. Mounting holes 626 are positioned proximate the ends of housing 510. Slots 624 and 625 are sized to receive rails 514, 515, 520, 521, 528 and 529. Middle portion 622 further includes attachment surface 628. Attachment surface 628 defines a series of aligned mounting holes 629. Mounting holes 629 are positioned proximate the ends of housing 510. Side 620 terminates in hook 632 while side 621 terminates in hook 633. Hooks 632 and 633 engage edges 120 and 122. Housing 511 is configured exactly as housing 510 and will not be described further.

In use, mounting bracket 100 securely and removably attaches a slide assembly to a closet partition for use with closet organizer components. Mounting bracket 100 provides advantages over directly mounting the slide assembly to the closet partition. Mounting bracket 100 includes a set of mounting holes 114 capable of aligning with the pre-drilled mounting holes 304 of a range of closet sizes. The slide assembly is easily "snapped" in and out of engagement with bracket 100 instead of being mounted directly to the closet partition. Further, mounting holes provided on standard slide assemblies often do not align with the pre-drilled mounting holes of common closet partitions requiring an installer to drill new holes in the closet partition that match the mounting holes in the slide assembly. The mounting bracket can be universally used with any of the disclosed closet organizer components or others.

Figure 8A:
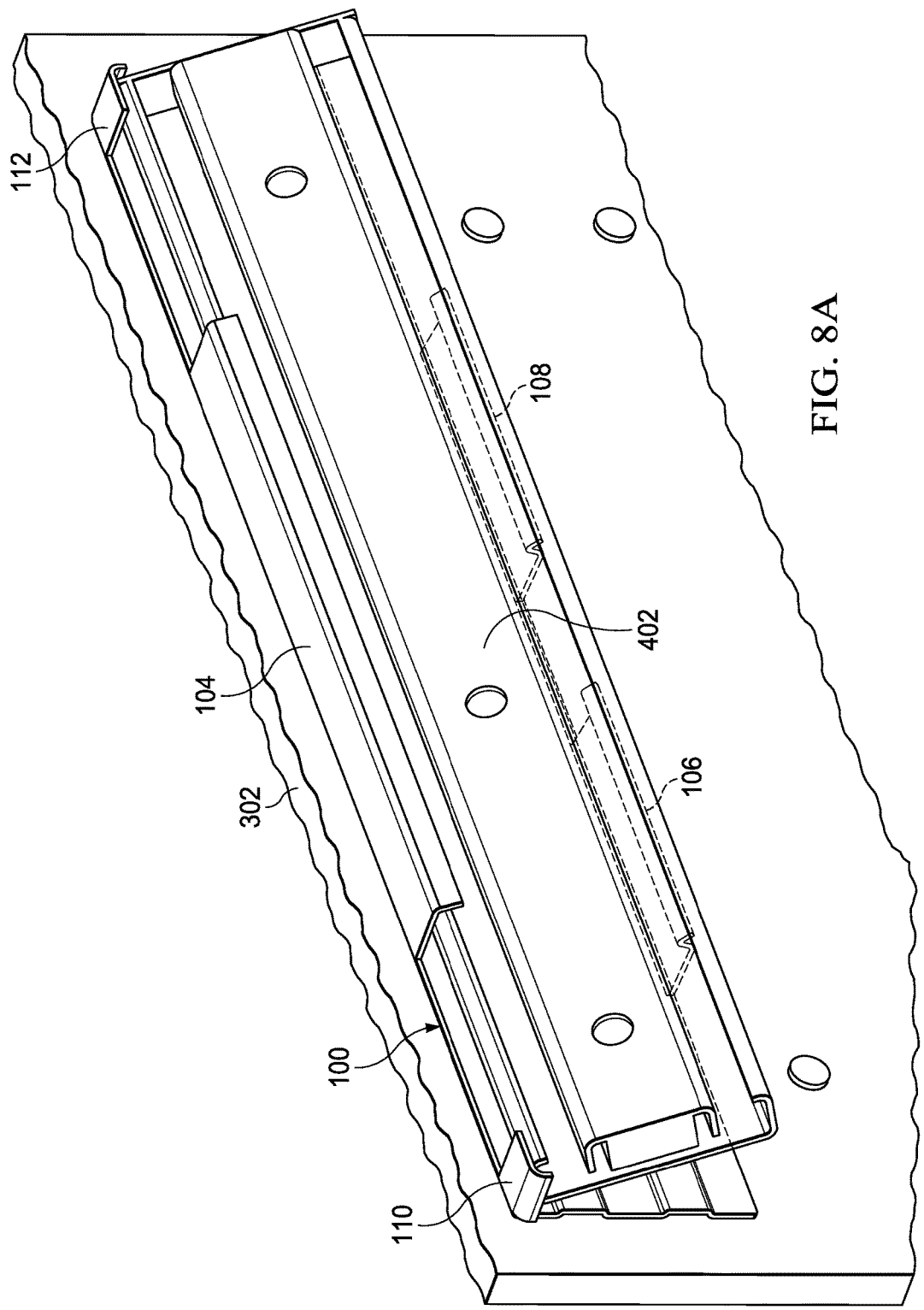
FIG. 8A is an isometric view of a slide assembly partially engaged with a preferred embodiment of a mounting bracket.
Figure 8B:
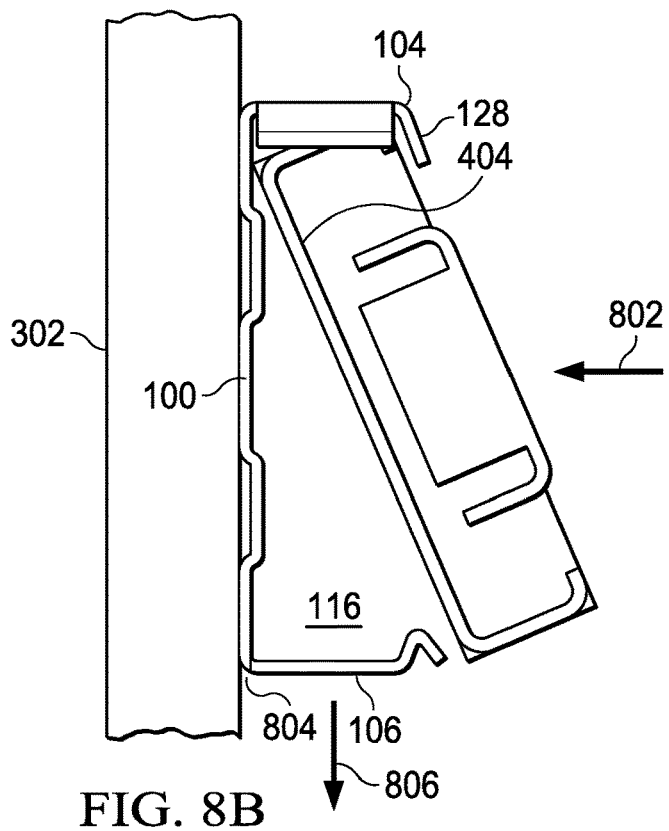
FIG. 8B is an end view of a slide assembly partially engaged with a preferred embodiment of a mounting bracket.

Referring to FIGS. 8A and 8B, drawer slide assembly 402 is attached to mounting bracket 100 by placing drawer slide assembly 402 within interior 116 such that the upper edge of outer rail 404 simultaneously abuts side 144, guide flange 104, and end flanges 110 and 112. The upper edge of outer rail 404 is behind hook 128 and the lower edge of outer rail 404 contacts abutment surfaces 150 and 151. A force in direction 802 urges spring flanges 106 and 108 to resiliently deform about pivot point 804 in direction 806. Spring flanges 106 and 108 continue to deflect in direction 806 until the lower edge of outer rail 404 passes bent sections 130 and 132. Once outer rail 404 passes bent sections 130 and 132, spring flanges 106 and 108 return to generally perpendicular to web 102.

Figure 9B:
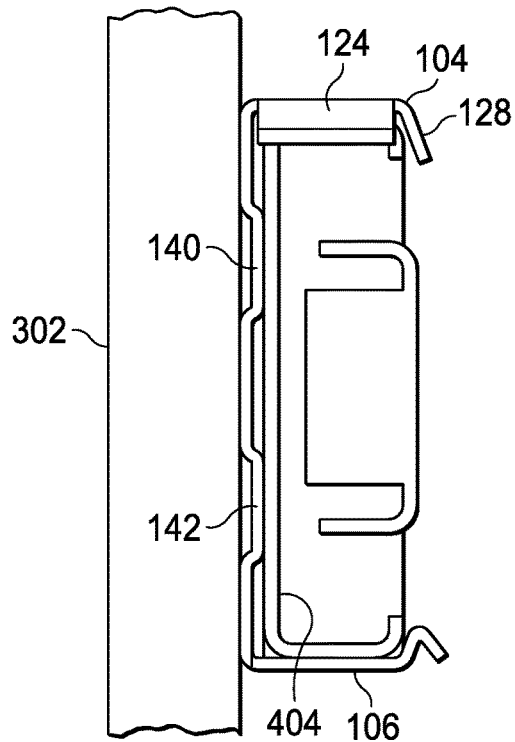
FIG. 9B is an end view of a slide assembly engaged with a preferred embodiment of a mounting bracket.
Figure 9A:
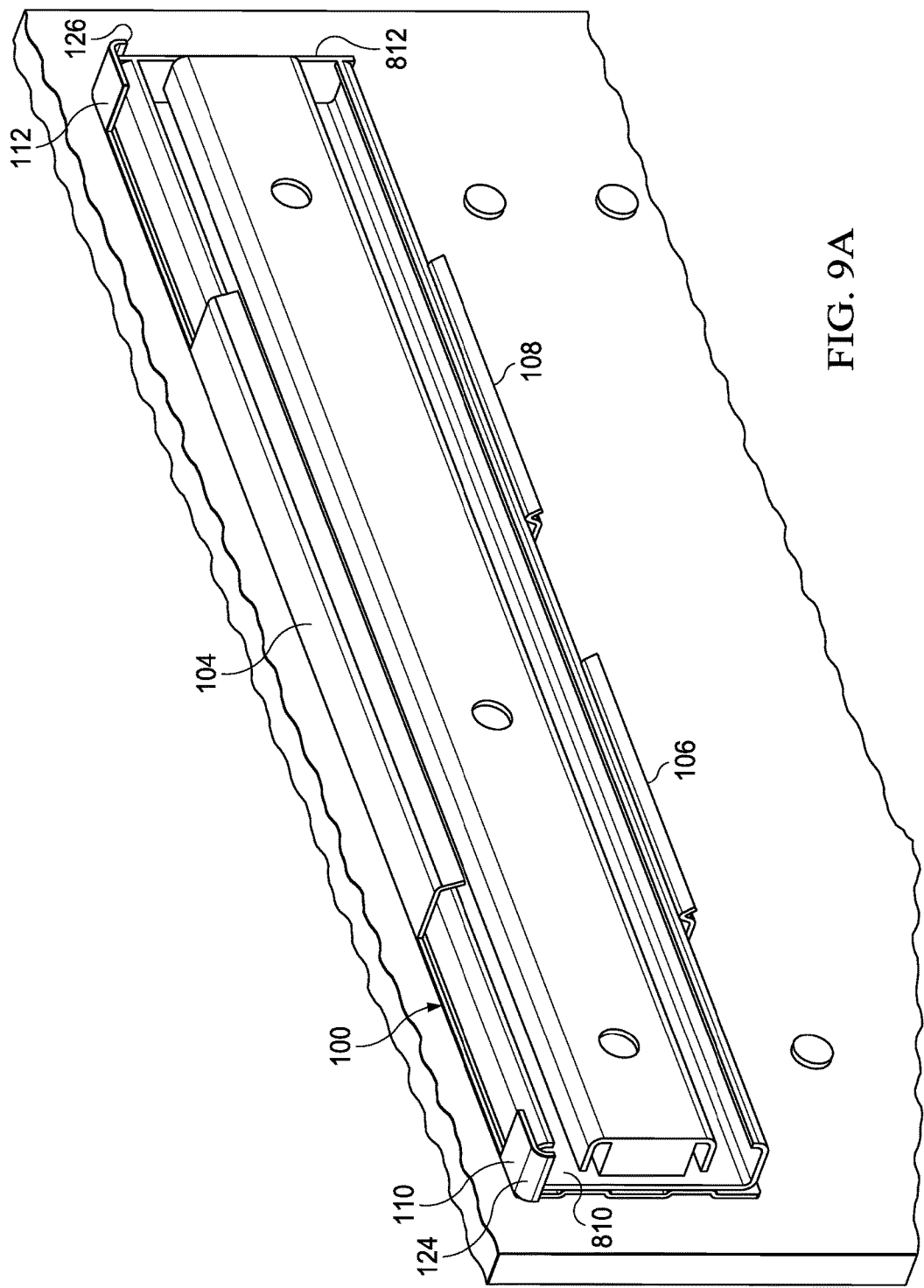
FIG. 9A is an isometric view of a slide assembly engaged with a preferred embodiment of a mounting bracket.

As shown in FIGS. 9A and 9B, drawer slide assembly 402 is securely attached to bracket 100. Outer rail 404 is simultaneously adjacent ridges 140 and 142, guide flange 104, and spring flanges 106 and 108. End 810 of outer rail 404 abuts hook 124 while end 812 of outer rail 404 abuts hook 126. Outer rail 404 further abuts hook 128 and holding surfaces 152 and 153. The spring tension of spring flanges 106 and 108 hold the slide assembly in place within the mounting bracket and prevent rotation of the slide assembly about longitudinal axis 154. The spring tension of spring flanges 106 and 108 along with hooks 124 and 126 prevent longitudinal movement of the slide assembly along longitudinal axis 154.

Figure 10:
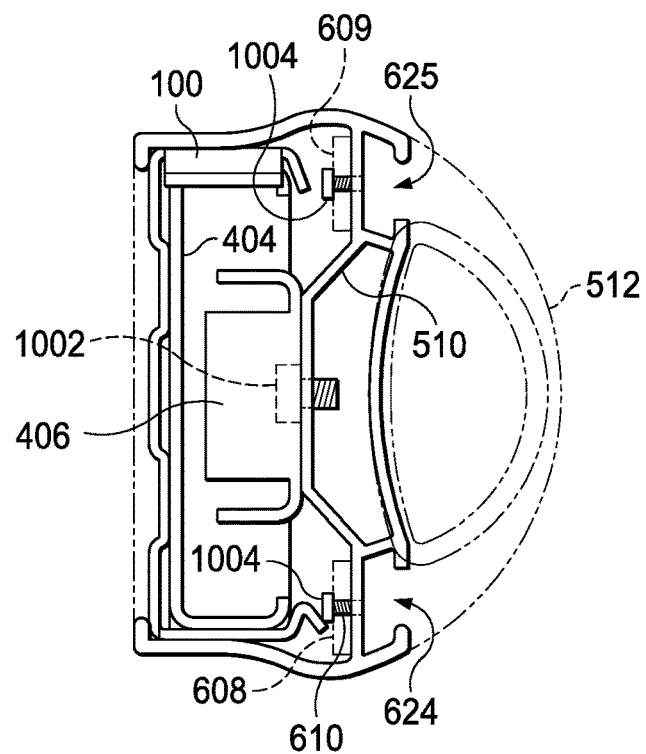
FIG. 10 is a cross-section view of a slide assembly attached to a universal housing and front end cover for closet organizer components.

As shown in FIG. 10, slide assembly 402 snaps into bracket 100. Housing 510 is attached to inner rail 406 via connecting hardware 1002 through mounting holes 629. Tabs 608 and 609 are secured to housing 510 proximate slots 624 and 625, respectively. Connecting hardware 1004 secure the tabs through mounting holes 610 and 626. Connecting hardware 1002 and 1004 are common in the art such as screws, rivets, or nuts and bolts. In alternate embodiments, adhesive could be used. The assembly shown in FIG. 10 is applicable to tie rack 502, belt rack 504, and pants rack 506. Housing 511 and front cap 513 attached to slide assembly 402 is configured similarly and will not be described further.

Figure 11:
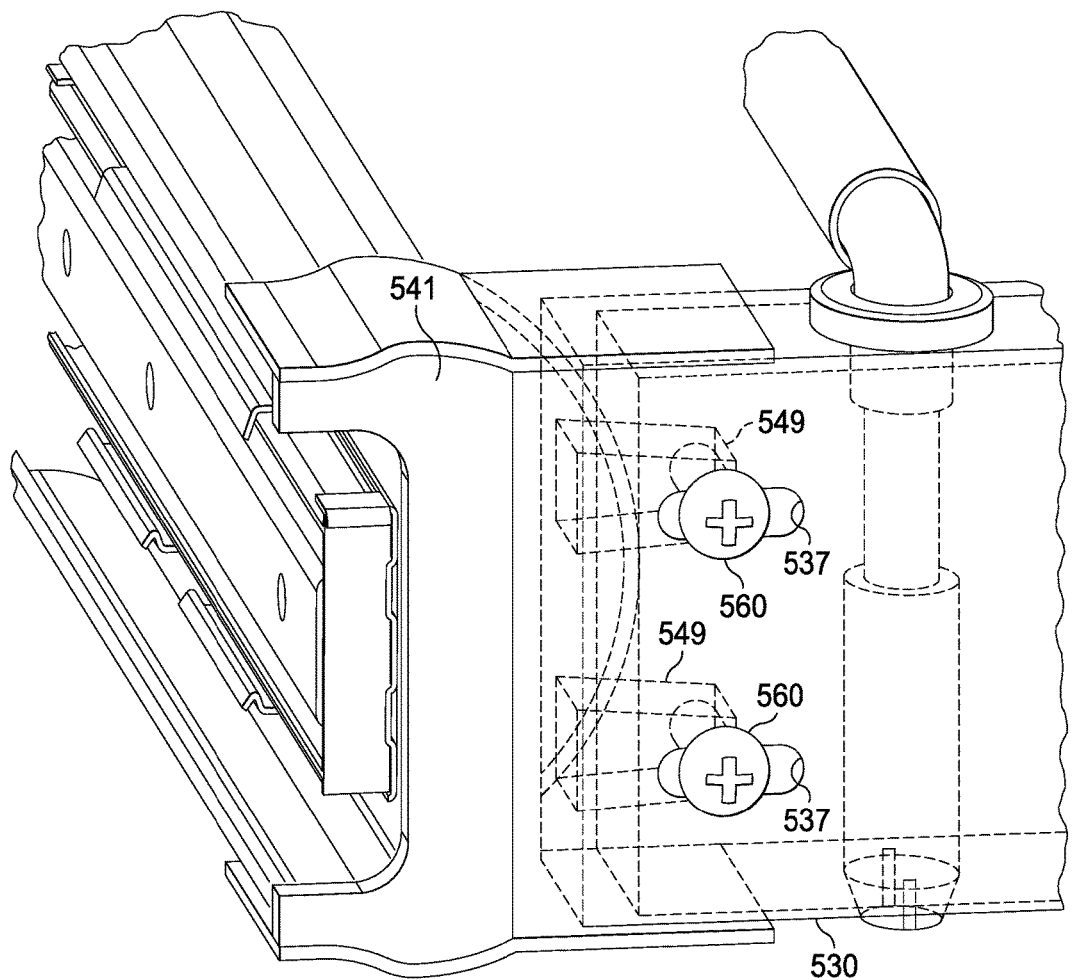
FIG. 11 is a partial isometric view of a brace attached to a universal housing for a pants rack.

As shown in FIG. 11, the spacing between housings 510 and 511 of pants rack 506 can be adjusted. Connecting hardware 560 is loosened within stanchions 549 and mounting slots 537. Brace 530 is moved in either direction along longitudinal axis 556 until the desired spacing is achieved. Moving brace 530 causes connecting hardware 560 to move along the length of mounting slots 537. The adjustment can also be performed on the opposite end of brace 530 with connecting hardware 560 in stanchions 548 and mounting slots 536. No matter the spacing chosen, hood sections 544 and 545 conceal the ends of brace 530 to give the appearance of one solid piece extending between housings 510 and 511.

After attaching the mounting bracket to the closet partition, snapping the slide assembly into engagement with the mounting bracket, and attaching the tie rack 502, belt rack 504, or pants rack 506 to the slide assembly, the tie rack 502, belt rack 504, or pants rack 506 is slidable in direction 558 between a stored position within the closet and a deployed position exterior to the closet. Front caps 512 and 513 can be used as a handle to facilitate the deploying and storing movement.

It will be appreciated by those skilled in the art that changes could be made to the embodiments described above without departing from the broad inventive concept. It is understood, therefore, that this disclosure is not limited to the particular embodiments herein, but it is intended to cover modifications within the spirit and scope of the present disclosure as defined by the appended claims.

The invention claimed is:

1. A snap-in mounting bracket for removable attachment of a closet organizer comprising:
   a guide flange, having a first flat retaining hook, extending in a first direction from a first edge of a web;
   a first end flange, having a second flat retaining hook, extending in the first direction from the first edge at a first end;
   a second end flange, having a third flat retaining hook, extending in the first direction from the first edge at a second end;
   wherein the first flat retaining hook is generally perpendicular to the second flat retaining hook and the third flat retaining hook;
   a plurality of mounting holes in the web;
   a spring flange, having a first angled retaining hook, extending in the first direction from a second edge of the web;
   wherein the first angled retaining hook is positioned generally parallel and opposite to the first flat retaining hook.

2. The snap-in mounting bracket of claim 1 wherein the first angled retaining hook further comprises:
   an abutment surface connected to a holding surface.

3. The snap-in mounting bracket of claim 1 further comprising:
   a holding surface extending from the spring flange;
   an abutment surface extending from the holding surface; and,
   wherein the abutment surface is oriented at an angle from the spring flange.

4. The snap-in mounting bracket of claim 3 wherein the angle ranges between 30° and 60°.

5. The snap-in mounting bracket of claim 1 wherein the spring flange comprises a plurality of spring flanges.

6. The snap-in mounting bracket of claim 1
   wherein each hole of the plurality of mounting holes has a first longitudinal axis;
   wherein the web has a second longitudinal axis; and,
   wherein the first longitudinal axis is parallel with the second longitudinal axis.

7. The snap-in mounting bracket of claim 6 wherein the web further comprises:
   a first ridge formed in the web, extending toward an interior of the snap-in mounting bracket, and parallel with the second longitudinal axis;
   a second ridge formed in the web, extending toward the interior, and parallel with the second longitudinal axis; and,
   a recess formed in the web between the first ridge and the second ridge, and parallel with the second longitudinal axis.

8. The snap-in mounting bracket of claim 7 wherein the plurality of mounting holes are positioned in the recess.

9. An interchangeable closet organizer for slidable deployment from a closet comprising:

a first resilient mounting bracket having a web, configured to be rigidly affixed to the closet;
the web further comprising a first edge opposed to a second edge and a first end opposed to a second end;
a guide flange, having a first flat retaining hook, extending in a first direction from the first edge;
a first end flange, having a second flat retaining hook, extending in the first direction from the first edge at the first end;
a second end flange, having a third flat retaining hook, extending in the first direction from the first edge at the second end;
wherein the first flat retaining hook is generally perpendicular to the second flat retaining hook and the third flat retaining hook;
a set of spring flanges, with each spring flange in the set of spring flanges having one of a set of angled retaining hooks;
wherein each spring flange of the set of spring flanges extends in the first direction from the second edge;
wherein each angled retaining hook of the set of retaining hooks is positioned generally parallel and opposite to the first flat retaining hook;
a first slide assembly releasably retained by the first end flange, the second end flange, the guide flange, and the set of spring flanges;
a first housing rigidly attached to the first slide assembly; and,
wherein the first housing is movable between a first stored position within the closet and a first deployed position exterior to the closet.

10. The interchangeable closet organizer of claim 9 further comprising a set of pins extending from the first housing.

11. The interchangeable closet organizer of claim 9 wherein each spring flange further comprises:
an abutment surface connected to a holding surface; and,
wherein the abutment surface is oriented at an angle from the holding surface.

12. The interchangeable closet organizer of claim 11 wherein the angle ranges between 30° and 60°.

13. The interchangeable closet organizer of claim 9 further comprising:
a second slide assembly configured to be interchangeably adjacent the first end flange, the second end flange, the guide flange, and the set of spring flanges;
a second housing, having a front cap, rigidly attached to the second slide assembly;
wherein at least the second housing is movable between a second stored position within the closet and a second deployed position exterior to the closet using the front cap as a handle;
wherein the first housing has a first rail including a first set of "T" shaped pins; and,
wherein the second housing has a second rail including a second set of "T" shaped pins.

14. The interchangeable closet organizer of claim 13 further comprising:
a second resilient mounting bracket having a second web, configured to be rigidly affixed to the closet;
the second web further comprising a third edge opposed to a fourth edge and a third end opposed to fourth end;
a second guide flange, having a fourth flat retaining hook, extending in a second direction from the third edge;
a third end flange, having a fifth flat retaining hook, extending in the second direction from the third edge at the third end;
a fourth end flange, having a sixth flat retaining hook, extending in the second direction from the third edge at the fourth end;
wherein the fourth flat retaining hook is generally perpendicular to the fifth flat retaining hook and the sixth flat retaining hook;
a second set of spring flanges, with each spring flange in the second set of spring flanges having one of a second set of angled retaining hooks;
wherein each spring flange of the second set of spring flanges extends in the second direction from the fourth edge;
wherein each angled retaining hook is positioned generally parallel and opposite to the fourth flat retaining hook;
a brace connected to the first housing and the second housing; and,
a set of bars extending from and pivotally engaged with the brace.

15. A method of attaching a slidable closet organizer to a closet partition, the closet partition having pre-drilled mounting holes, the slidable closet organizer having a resilient mounting bracket with a set of mounting holes, and having a first slide assembly configured to be releasably attached to the resilient mounting bracket, comprising:
providing a web, having a first edge opposed to a second edge, having a first generally centrally located longitudinal axis, and having a first end opposite a second end;
wherein each mounting hole of the set of mounting holes has a second longitudinal axis positioned to coincide with the first generally centrally located longitudinal axis;
providing a guide flange, having a first flat retaining hook, extending in a first direction from the first edge of the web;
wherein the first flat retaining hook extends in a second direction toward an interior of the resilient mounting bracket;
providing a first end flange, having a second flat retaining hook, extending in the first direction from the first edge at the first end of the web;
providing a second end flange, having a third flat retaining hook, extending in the first direction from the first edge at the second end of the web;
providing the first flat retaining hook to be generally perpendicular to the second flat retaining hook and the third flat retaining hook;
providing a set of spring flanges, with each spring flange in the set of spring flanges having one of a set of angled retaining hooks;
wherein each spring flange extends in the first direction from the second edge;
wherein each angled retaining hook is positioned generally parallel and opposite to the first flat retaining hook;
aligning the set of mounting holes with the pre-drilled mounting holes;
attaching the resilient mounting bracket to the closet partition;
abutting the guide flange, the first end flange, and the second end flange with a first edge of the first slide assembly;
wherein the mounting holes are positioned at the interior of the resilient mounting bracket and are adjacent the first slide assembly;
abutting the set of spring flanges with a second edge of the first slide assembly;

deforming the set of spring flanges with the second edge of the first slide assembly; and, returning the set of spring flanges to a pre-deformed position.

16. The method of claim 15 further comprising:

providing a first set of pins positioned on the first slide assembly;

moving the set of spring flanges from a pre-deformed position into a deformed position;

removing the first slide assembly from the set of spring flanges, the guide flange, the first end flange, and the second end flange;

providing a second slide assembly having a second set of pins;

abutting the first flat retaining hook and the second flat retaining hook with the second slide assembly;

deforming the set of spring flanges with an edge of the second slide assembly; and, returning the set of spring flanges from the deformed position to the pre-deformed position.

\* \* \* \* \*